No. 11,721. Reissued Mar. 7, 1899.

E. H. KINNAMAN & B. F. FLOWERS.

BELL DOOR KNOB.

(Application filed Feb. 1, 1899.)

Witnesses

H. M. Neff

Nellie G. Daniels

Inventors,

Edward H. Kinnaman,

Benjamin F. Flowers,

By A. J. Brice

Attorney.

UNITED STATES PATENT OFFICE.

EDWARD H. KINNAMAN AND BENJAMIN F. FLOWERS, OF FORT COLLINS, COLORADO.

BELL DOOR-KNOB.

SPECIFICATION forming part of Reissued Letters Patent No. 11,721, dated March 7, 1899.

Original No. 590,192, dated September 14, 1897. Application for reissue filed February 1, 1899. Serial No. 704,202.

*To all whom it may concern:*

Be it known that we, EDWARD H. KINNAMAN and BENJAMIN F. FLOWERS, citizens of the United States, residing at Fort Collins, in the county of Larimer and State of Colorado, have invented certain new and useful Improvements in Bell Door-Knobs; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in door-bells, and more particularly to bell door-knobs.

The object of this invention is to provide a combination door-knob and bell which is exceedingly cheap and simple in its construction and one which can be easily secured to any of the doors and locks now in use.

With these objects in view our invention consists of the parts and in the novel manner of combining and arranging said parts hereinafter described, and pointed out in the claims.

Figure 1:
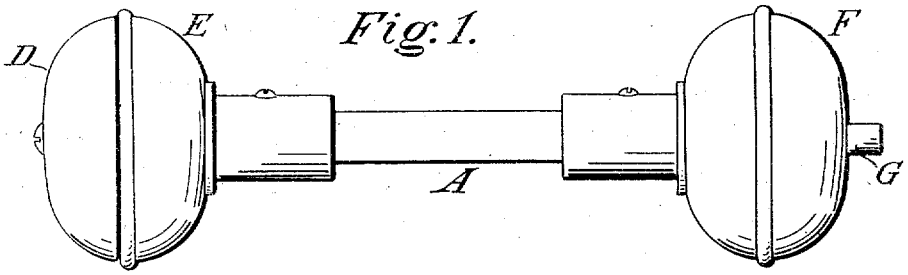
Figure 2:
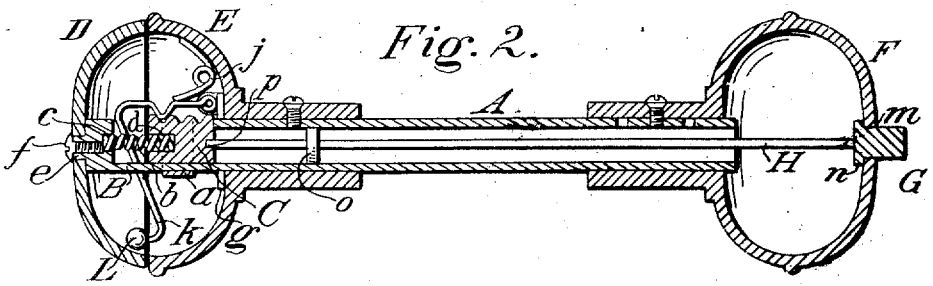
Figure 3:
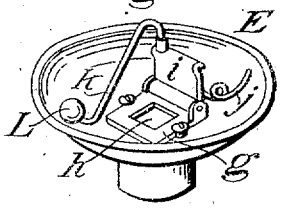

In the drawings forming a part of this specification, Figure 1 is a side elevation of the knob, spindle, and bell and knob combined embodying our improved features. Fig. 2 is a central vertical section through the same. Fig. 3 is a perspective view in detail of the clapper mounted in the lower portion of the bell.

Referring to the drawings, A designates a square hollow spindle having a slot B in one end thereof. Mounted in the said slot is a ratchet C, provided with a band *a*, which is clamped around the spindle and secured to the sides of the ratchet. This ratchet is one-half the length of the said slot and is adjustably held therein by the said band. If preferred, the ratchet and band may be made in one piece adjustably secured therein in any manner desired. A spiral spring *b*, having one end secured in the recess *c* of the hollow spindle A and the other in the recess *d* of the ratchet C, serves to keep the said ratchet located in the lower end of the slot, and when the said spring is contracted by forcing the ratchet to the upper end of the slot it is partly secreted within the recess *c* and partly within the recess *d*.

The end of the spindle nearest the slot is internally screw-threaded and provided with a shoulder *e* for the support of the gong or ringing portion of the bell D, which is secured thereon by a screw *f*, which passes through the said bell and engages the internal screw-threads. Mounted upon the spindle below the slot is the lower portion of the bell E, having secured to its bottom a platform *g*, said platform having an aperture *h*, through which the spindle is passed. This platform is also provided with oppositely-disposed ears bent at right angles to the said platform. If desired, this platform might be dispensed with and the ears cast on the lower portion of the bell. Pivotally secured between these ears is a cam *i*, which is held in engagement with the ratchet C by the spring *j*. Secured to the upper portion or end and to one side of the said cam is an S-shaped wire *k*, having secured to its loose end a clapper L. Secured to the other end of the spindle is a knob F, provided with an aperture *m*, in which is located the press-button G, provided with a shoulder *n* on the inside of the knob, which prevents the said button from falling out. This press-button is connected with a rod H, extending through the hollow spindle and having a washer *o* secured thereto in order to give the said rod a central location in the said spindle. The end of this rod is supported in the recess *p* of the ratchet C.

By pressing the button the ratchet is made to traverse the slot in the spindle, thus throwing the cam into and out of engagement with the said ratchet and operating the clapper, which rings the bell repeatedly.

It will thus be seen that we provide a bell door-knob which is compact, durable, and simple in its construction and which will proficiently perform all of its intended functions.

Having thus described our invention, what we claim is—

1. The combination of a hollow spindle, two knobs mounted thereon, a suitable clapper device located in one of said knobs, and a push-rod passing through the hollow spindle and adapted to operate the clapper device, one extremity of the push-rod being exposed through an opening formed in the other knob.

2. The combination of a hollow revoluble spindle, two knobs mounted thereon, a clapper device located in one of said knobs, a reciprocating push-rod located in the spindle and adapted to operate the clapper device, and a push-button attached to the rod and located in an opening formed in the other knob.

3. The combination of a hollow revoluble spindle, angular in cross-section, whereby it is adapted to operate lock mechanism, two knobs mounted on said spindle, a bell-ringing device located in one knob, a movable rod passing through said spindle and adapted to operate the bell-ringing device, the other knob being provided with an opening to permit access to the operating-rod.

4. The combination of a hollow spindle, a hollow bell-knob mounted on one end of the spindle, means located therein for ringing the bell, a rod located in the spindle and adapted to operate the bell-ringing means, and a knob attached to the spindle remote from the bell-knob and provided with an opening to permit access to the operating-rod.

5. The combination of a revoluble spindle adapted to operate lock mechanism, said spindle being provided with a longitudinal opening, a bell-knob attached to one end of the spindle, a suitable bell-ringing device located therein, a movable rod passing through an opening in the spindle and adapted to operate said device, and a knob attached to the opposite extremity of the spindle and provided with an opening to permit access to the bell-operating rod, which projects thereinto.

6. A combination door-knob and bell comprising a revoluble hollow spindle adapted to pass through a lock, and knobs attached thereto, one of which is provided with a gong, a clapper device located within the said knob and adapted to act on the gong portion thereof, a rod located in said spindle and adapted to operate the clapper device, the knob remote from the bell-knob having an opening, and a push-button attached to said rod and located in said opening.

7. The combination of a spindle, a bell-knob attached to one end of the spindle, an apertured knob attached to the other end of the spindle, a clapper device located in the bell-knob, a push-rod carried by the spindle and adapted to operate the clapper device, said rod projecting into the opening of the other knob.

8. A combination door-knob and bell comprising a revoluble lock-operating spindle provided with a longitudinal opening, a bell-knob attached to one extremity of the spindle, an apertured knob attached to the other extremity of the spindle, a clapper device located in the bell-knob, and a rod passing through the apertured knob and located in the spindle-opening, and adapted to operate the clapper device.

9. In a bell door-knob the combination of a square hollow spindle having a slot in one end thereof and a ratchet mounted in and adapted to traverse the said slot, a spring engaging said ratchet, a platform secured in the lower portion of the bell, said platform having an aperture through which the said spindle passes and oppositely-disposed ears bent at right angles to the said platform, a cam pivotally secured between the said ears, said cam supporting the clapper and held in engagement with the ratchet by a spring, and a rod connecting the said ratchet with a push-button.

In testimony whereof we affix our signatures in the presence of two witnesses.

EDWARD H. KINNAMAN.
BENJAMIN F. FLOWERS.

Witnesses:
L. C. MOORE,
E. D. AVERY.